Jan. 12, 1943. P. A. SCOTT-IVERSEN ET AL 2,308,212
WIND SCREEN WIPER FOR MOTOR VEHICLES
Filed June 13, 1939 3 Sheets-Sheet 3
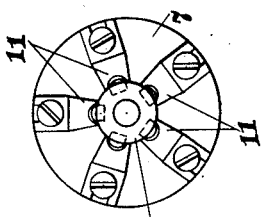
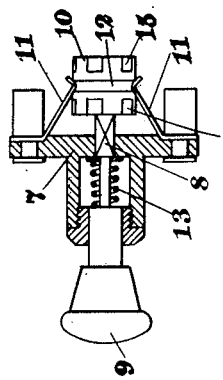
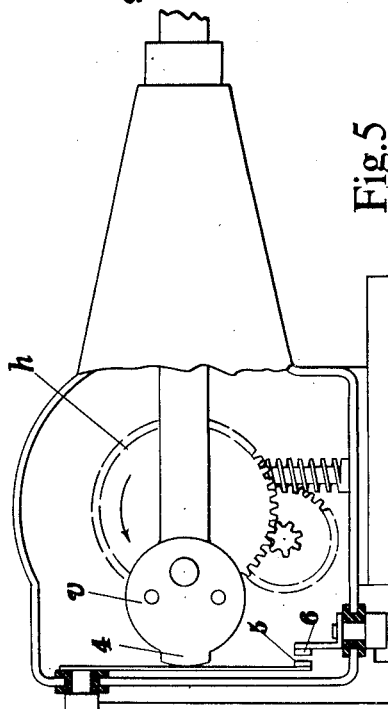
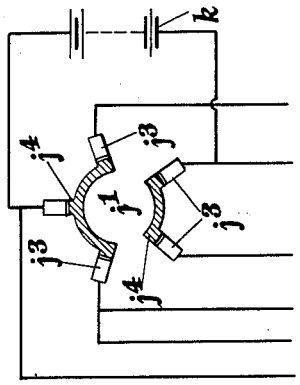
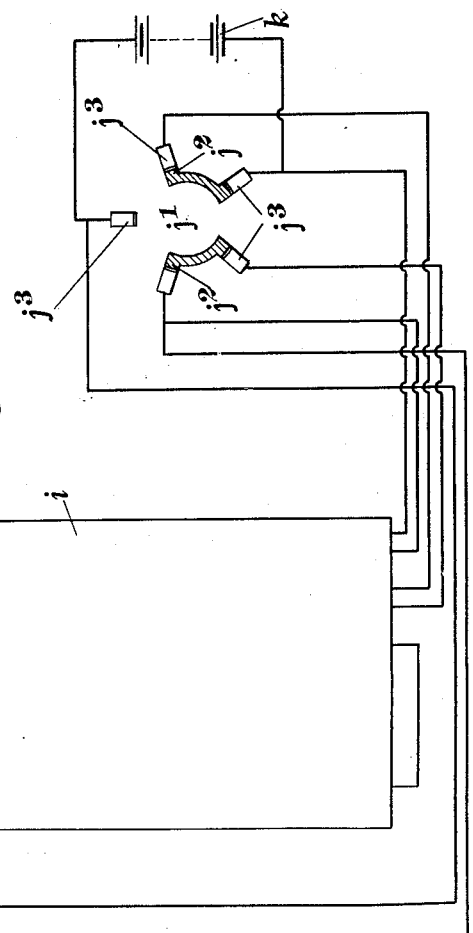

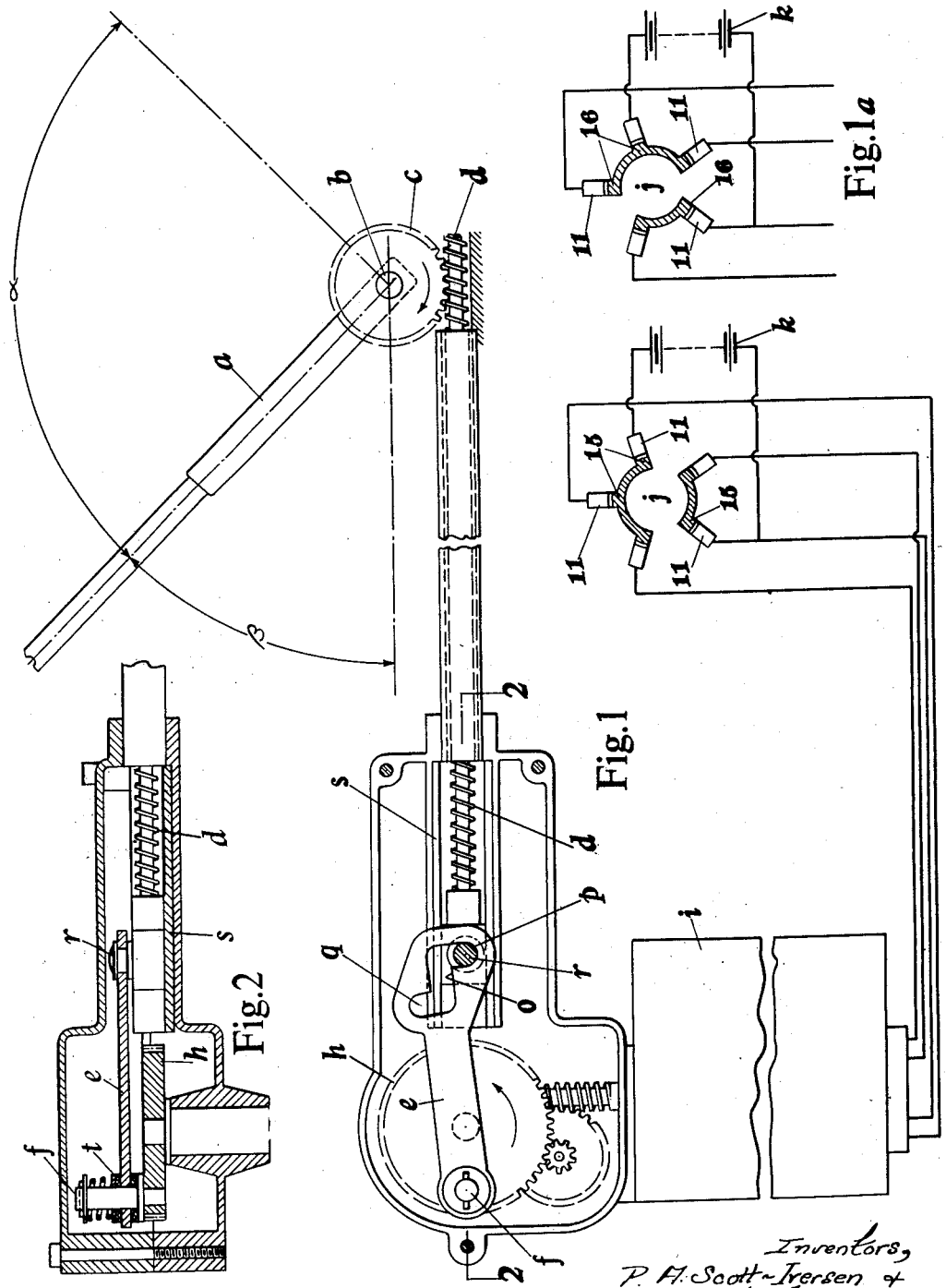

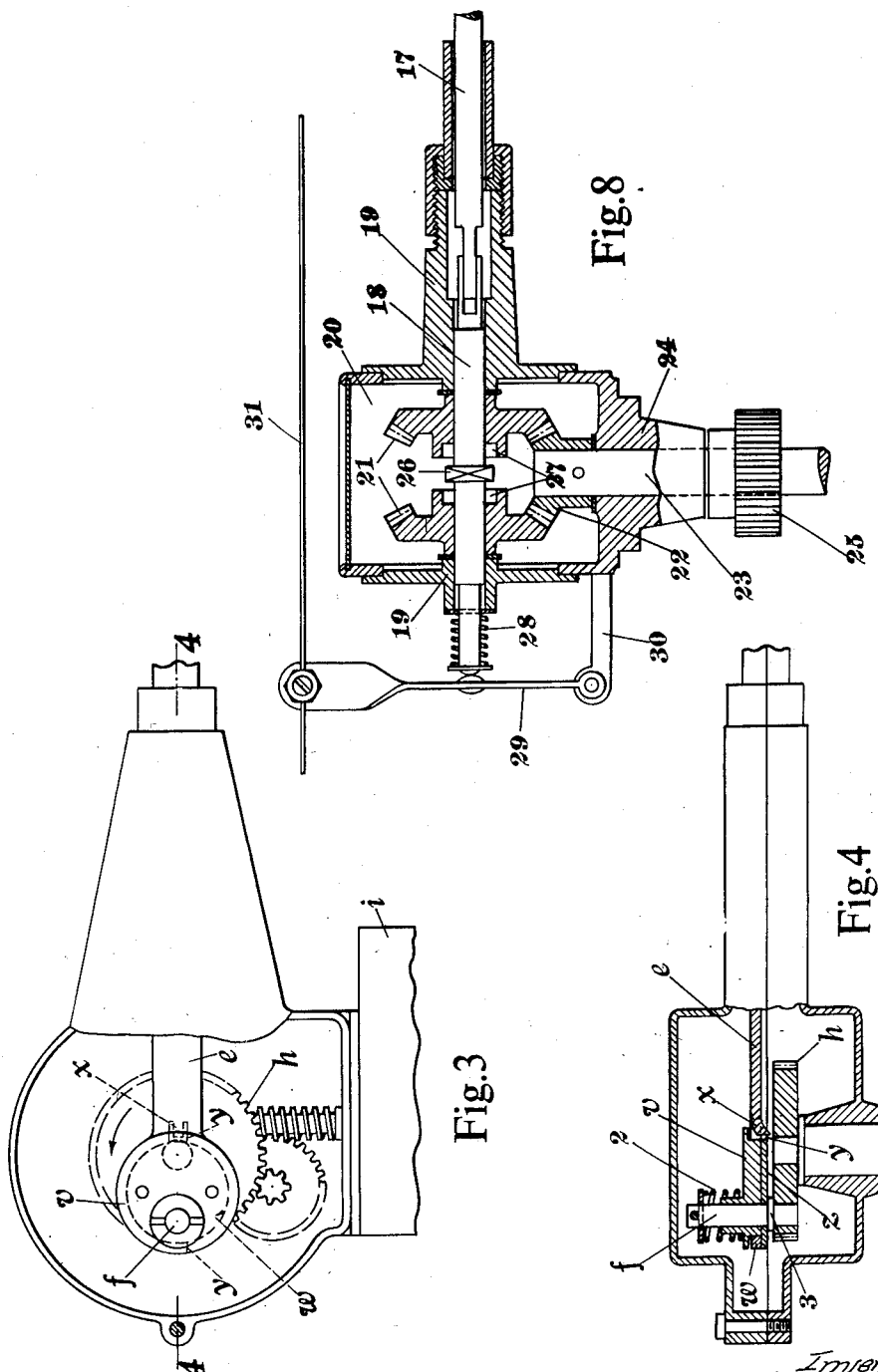

Patented Jan. 12, 1943

2,308,212

UNITED STATES PATENT OFFICE 2,308,212

WIND SCREEN WIPER FOR MOTOR VEHICLES

Poul Arne Scott-Iversen and Alfred Huyton, Birmingham, England, assignors to Joseph Lucas Limited, Birmingham, England Application June 13, 1939, Serial No. 278,986
In Great Britain June 17, 1938

3 Claims. (Cl. 74—586)

This invention relates to wind screen wipers for motor vehicles. It is usually required that such a wiper shall be capable of oscillatory or reciprocatory movement over an appropriate area of the wind screen when in use, and of being located in a non-obstructive (or parking) position at one side of that area when at rest. The object of the present invention is to enable this condition to be satisfied in a manner which is convenient to the user and which also facilitates the mounting of the wiper mechanism and its associated parts on the vehicle.

The invention comprises a wiper actuating mechanism having in combination a reversible driving crank, a slidable driven member, a connecting rod of variable effective length interconnecting the driving crank and driven member, and means including a friction device whereby reversal of the direction of motion of the driving crank causes variation of the effective length of the connecting rod.

In the accompanying sheets of explanatory drawings:

Figure 1 is an elevation of a wind screen wiper embodying one form of the invention.

Figure 1a illustrates another position of the control switch shown in Figure 1.

Figure 2 is a section on the line 2—2 of Figure 1.

Figure 3 is an elevation illustrating a modified form of the invention, and Figure 4 is a section on the line 4—4 of Figure 3.

Figure 5 is a view of mechanism similar to that shown in Figures 3 and 4 but incorporating means for automatically bringing the mechanism to rest.

Figure 5a illustrates another position of the control switch shown in Figure 5.

Figure 6 is a sectional side elevation and Figure 7 a rear end elevation of a control switch.

Figure 8 is a sectional elevation of reversible mechanical means for imparting motion to the wiper mechanism.

Referring to Figures 1 and 2, a portion of an oscillatory wiper arm is indicated by $a$. To its spindle $b$ is secured a pinion $c$ which is engaged by a reciprocatory rack $d$. In the form illustrated the rack is of known flexible form and consists of a helically-wound wire mounted on a flexible wire core. Only one arm is shown in the drawings. When (as is usual) two arms are used and respectively situated in positions on the wind screen in front of the driver and front passenger, the two racks are interconnected, or the one rack is made sufficiently long to actuate the pinions of both arms. The arm (or each arm) is movable on the screen through an angle as indicated by $\alpha$ which includes the normal wiping area of the arm. When the mechanism is put out of action the arm (or each arm) is moved through an angle as indicated by $\beta$ to a parking position outside the normal range of vision.

According to our invention in the form exemplified in Figures 1 and 2, we arrange one end of the rack $d$ (or of a part attached thereto) to slide in a guide $s$, and we attach that end by a connecting rod $e$ of variable effective length, the latter being driven through any appropriate reduction mechanism from a reversible electric motor $i$. In combination with the electric motor $i$ is arranged any convenient reversing switch $j$ which controls the supply of electric current from the battery $k$ to the motor. Figure 1 shows the switch in position for normal operation of the motor and Figure 1a shows the switch in the position which gives reverse rotation of the motor.

At one end the rod $e$ is pivotally attached to a crank pin $f$ mounted on and at a fixed distance from the centre of the crank disc $h$. At the other end the connecting rod is formed with a slot $o$ having recesses $p$, $q$ at its ends. Either of these recesses can be occupied by a pin $r$ on the end of the rack or part $d$ which slides in the guide $s$. Any convenient provision is made, such as by means of a spring-loaded washer $t$, to set up a slight frictional resistance to relative movement between the crank disc $h$ and the connecting rod $e$. When the disc $h$ is rotated by the motor $i$ in the direction of the arrow and the pin $r$ occupies the recess $p$ in the rod $e$ the arm is moved through the angle $\alpha$ (Figure 1). When it is required to bring the wiper to rest in the parked position, the direction of rotation of the motor $i$ is reversed by appropriate actuation of the switch $j$. The first effect of this action is to cause the rod $e$ to swing relatively to the pin $r$ so as to carry the recess $p$ clear of the pin, this being ensured by the frictional resistance to relative movement between the connecting rod and crank disc. The pin $r$ may, however, continue to move with the rod $e$ until the crank disc has completed its half revolution, that is to say until the mechanism reaches the position shown in Figure 1. During the next half revolution the rod $e$ will move independently of the pin $r$ and at the end of that movement the rod will by the frictional resistance above described cause the recess $q$ to engage the pin $r$. With the continued rotation of the crank disc $h$ the wiper arm or arms will be moved through the angle $\beta$ (Figure 1), and upon the arm or arms reaching the end of that movement the motor $i$ is brought to rest either by a further action of the driver on the switch, or automatically in manner which will be exemplified later. On restarting the motor $i$ to rotate the crank disc $h$ in the direction of the arrow the interaction of the connecting rod $e$ and pin $r$ is reversed and the wiper arm (or each such arm) is brought back to the normal position in which it oscillates through the angle $\alpha$ (Figure 1).

Another form of connecting rod of variable effective length is exemplified at Figures 3 and 4. In this example the crank pin $f$ on the disc $h$ is connected to the adjacent end of the connecting rod $e$ through an eccentric $v$. This latter has the form of a disc which occupies an eye $w$ on the rod, and is capable of rotation on the crank pin $f$ through any convenient angle and preferably about 180°, the angle being determined by, for example, the interaction of a stop $x$ on the rod $e$ and a pair of abutments $y$ on the eccentric, or on a part $z$ secured to the eccentric. Any convenient provision is made for setting up a slight frictional resistance to relative movement between the crank disc $h$ and the eccentric $v$. For example, a spring 2 may serve to press the eccentric $v$, or the part $z$ secured to the eccentric, against a collar 3 on the crank pin $f$. When the crank disc $h$ rotates in the direction of the arrow shown in Figure 3, one of the abutments $y$ is in contact with the stop $x$, and the eccentric $v$ occupies a position in which its longest radius lies between the crank pin $f$ and the main part of the connecting rod $e$. During the continuance of this motion no relative movement can occur between the eccentric $v$ and the rod $e$ (which then has its greatest effective length), and the wiper arm (or each arm) is caused to oscillate through the angle $\alpha$ (Figure 1). But when the direction of rotation of the crank disc $h$ is reversed, the eccentric $v$ is caused to rotate on the crank pin $f$ and relatively to the rod $e$ until the other abutment $y$ comes into contact with the stop $x$, this movement of the eccentric being ensured by the frictional resistance to relative movement between the crank pin and the eccentric. The rod $e$ now has its smallest effective length, and the wiper arm (or each arm) is moved through the angle $\beta$ (Figure 1). Upon the wiper arm or arms reaching the end of this movement the motor $i$ is brought to rest as above described.

For enabling the motor $i$ to be brought to rest automatically when the wiper arm (or each arm) reaches the parking position, we may adapt any suitable part of the mechanism for actuating a switch in the circuit of the motor. For example, in Figure 5 (which illustrates mechanism similar to that shown in Figures 3 and 4), the eccentric $v$ is formed or provided with a projection 4 which is adapted to separate the switch contacts 5, 6 when the wiper arm (or each arm) reaches the parking position. These contacts 5, 6 are contained in the circuit of the motor $i$ when the reversing switch $j^1$ is in the position shown in Figure 5 for causing the reverse operation of the motor. But when the reversing switch $j^1$ is in the position shown in Figure 5a for causing normal operation of the motor $i$, the contacts 5, 6 are short circuited. The reversing switch $j^1$ is provided with a set of movable contacts $j^2$ for co-operating with fixed contacts $j^3$ when the switch is in the position shown in Figure 5, and with another set of movable contacts $j^4$ for co-operating with the fixed contacts $j^3$ when the switch is in the position shown in Figure 5a.

When it is required to effect the control of the mechanism solely by means of a hand operable switch, we may employ any convenient form of switch adapted to effect stopping and starting and reversal of the motor. An example of such a switch is illustrated in Figures 6 and 7 and will now be described and which embodies the system of contacts shown in Figures 1 and 1a. The body part 7 of this switch carries a slidable stem 8 which at one end is provided with an operating knob or finger piece 9, and at the other end carries a cylindrical member 10, the latter being provided with the movable contacts 15, 16 of the switch. The fixed contacts 11 of the switch are formed by a plurality of resilient metal strips which are secured at one end to the body part 7. At their free ends the fixed contacts 11 are adapted to co-operate with the movable contacts above mentioned for controlling the circuit of the motor. In the "off" position of the switch the stem 8 occupies the position shown, and the free ends of the fixed contacts 11 engage a central or other annular groove 12 formed in the periphery of the cylindrical member 10, the effect of this engagement serving to prevent unintentional movement of the stem. By pulling the knob or finger piece 9 outwards the stem 8 can be moved axially until the outer ends of the fixed contacts 11 co-operate with contacts 15 on the cylindrical member 10 for causing the motor to rotate in the direction for moving the wiper arm or arms through the angle $\alpha$ (Figure 1). By pushing the knob or finger piece 9 inwards against the action of a spring 13 the stem 8 can be moved axially in the opposite direction until the outer ends of the fixed contacts 11 co-operate with contacts 16 on the cylindrical member 10 for causing the motor to rotate in the direction for bringing the wiper arm or arms into the parking position. As soon as that position is reached the knob is released and is returned to the "off" position by the spring. An essentially similar reversing switch to that above described may be employed when the motor is brought to rest automatically as in the arrangement shown in Figure 5, the only difference being in the form and disposition of the movable contacts, and Figures 6 and 7 may therefore be also regarded as representing the reversing switch shown in Figures 5 and 5a.

Instead of employing an electric motor for imparting reversible motion to the mechanisms above described we may employ any other convenient means, such as reversible mechanical means adapted to be driven by the engine or any other part of the driving mechanism of the vehicle. An example of such means is shown in Figure 8 in which 17 indicates a flexible or other rotatable shaft for imparting reversible motion to any of the variable crank or equivalent mechanisms above described. This shaft 17 has a tongue-and-slot driving connection with another and aligned shaft 18 which is rotatably and slidably supported by bearings 19 at opposite sides of a chamber 20, one of these bearings being extended to accommodate the adjacent end of the shaft 17. Situated within the chamber 20 and rotatably mounted on the shaft 18 are a pair of toothed bevel wheels 21 which engage opposite sides of a third toothed bevel wheel 22 also situated within the chamber. The bevel wheel 22 is secured on the inner end of another rotatable shaft 23 which is arranged at right angles to the shaft 18, and which extends through a supporting bearing 24 at one end of the chamber.

On the outer end of the shaft 23 is provided a pinion 25 which is adapted to be driven by any convenient source of motion, such as the engine or any other part of the driving mechanism of the vehicle. Rotation of the pinion 25 causes the bevel wheels 21 to be rotated in opposite directions by the bevel wheel 22. For enabling either of the bevel wheels 21 to drive the shaft 17 through the shaft 18, the latter has formed on or secured to it a non-circular clutch member 26 which is situated between the bevel wheels 21, and which can be moved by appropriate sliding movement of the shaft 18 into engagement with either of a pair of complementary recesses 27 formed respectively in the adjacent sides of the bevel wheels 21. The tongue-and-slot connection between the shafts 17, 18 permits the required sliding movements of the shaft 18 to take place without disconnecting it from the shaft 17.

In the drawings the clutch member 26 is shown in its neutral position, that is, in a position out of engagement with both of the recesses 27, and is held in this position against the action of a spring 28 by a lever 29 acting on the end of the shaft 18 remote from the shaft 17, one end of the lever being pivoted to a projection or bracket 30 on the chamber 20, and the other end being attached to an operating cable 31. The spring 28 is arranged on the end of the shaft 18 adjacent to the lever 29 and serves to move this shaft in the direction for enabling the clutch member 26 to engage the recess 27 in one of the bevel wheels 21. Movement of the lever 29 in the appropriate direction from the position shown causes the shaft 18 to move against the action of the spring 28 in the direction for enabling the clutch member 26 to engage the recess 27 in the other bevel wheel 21.

By this invention we are able to provide simple and convenient mechanism which not only enables the wiper arm or arms to be moved over an appropriate area of the wind screen when in use, and to be moved into a non-obstructive (or parking) position at one side of that area when not required for use, but also facilitate the mounting of the wiper mechanism and its associated parts in position on the vehicle.

Having thus described our invention what we claim as new and desire to secure by Letters Patent is:

1. Wind screen wiper actuating mechanism having in combination a reversible driving crank, a slidable driven member, a connecting rod of variable effective length interconnecting the driving crank and driven member, and means including a friction device whereby reversal of the direction of motion of the driving crank causes variation of the effective length of the connecting rod.

2. Wind screen wiper actuating mechanism comprising the combination of a reversible driving crank disc, a crank pin on the disc, a slidable driven member, a connecting rod of variable effective length pivotally attached at one end to the crank pin and provided at the other end with a longitudinal slot having a recess at each end, a pin provided on the slidable driven member and adapted to occupy either of the recesses in the connecting rod, and a friction device opposing relative movement between the crank disc and connecting rod, the arrangement being such that reversal of the direction of motion of the crank disc causes the effective length of the connecting rod to be varied automatically.

3. Wind screen wiper actuating mechanism comprising the combination of a reversible driving crank, a slidable driven member, a connecting rod of variable effective length connected to the driven member, an eccentric interconnecting the crank and connecting rod, the eccentric being capable of rotational movement to the crank and connecting rod through a predetermined angle, interacting means provided in part on the connecting rod, and in part on the eccentric for determining the angle through which the eccentric can move relatively to the crank and connecting rod, and a friction device opposing relative movement between the eccentric and crank, the arrangement being such that on reversal of the direction of motion of the crank the eccentric causes the effective length of the connecting rod to be varied.

POUL ARNE SCOTT-IVERSEN.
ALFRED HUYTON.